US010150414B2

(12) United States Patent
Myers et al.

(10) Patent No.: US 10,150,414 B2
(45) Date of Patent: Dec. 11, 2018

(54) PEDESTRIAN DETECTION WHEN A VEHICLE IS REVERSING

(71) Applicant: Ford Global Technologies, LLC, Dearborn, MI (US)

(72) Inventors: Scott Vincent Myers, Camarillo, CA (US); Alexandru Mihai Gurghian, Palo Alto, CA (US); Ashley Elizabeth Micks, Mountain View, CA (US); Ramchandra Ganesh Karandikar, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 16 days.

(21) Appl. No.: 15/205,701

(22) Filed: Jul. 8, 2016

(65) Prior Publication Data

US 2018/0009378 A1  Jan. 11, 2018

(51) Int. Cl.
*B60Q 1/00* (2006.01)
*B60R 1/00* (2006.01)
*B60Q 9/00* (2006.01)
*G08G 1/16* (2006.01)
*H04N 7/18* (2006.01)

(52) U.S. Cl.
CPC ............... *B60R 1/00* (2013.01); *B60Q 9/008* (2013.01); *G08G 1/166* (2013.01); *H04N 7/18* (2013.01); *B60R 2300/301* (2013.01); *B60R 2300/302* (2013.01); *B60R 2300/307* (2013.01); *B60R 2300/8066* (2013.01)

(58) Field of Classification Search
CPC . B60R 1/00; B60R 2300/30; B60R 2300/302; B60R 2300/307; B60R 2300/8066; B60Q 9/008; G08G 1/166; H04N 7/18

USPC .......................................................... 340/435
See application file for complete search history.

(56) References Cited

U.S. PATENT DOCUMENTS

| 7,209,221 | B2 | 4/2007 | Breed | |
|---|---|---|---|---|
| 7,817,848 | B2 | 10/2010 | Sakata | |
| 8,179,281 | B2 * | 5/2012 | Strauss | ............... G08G 1/163 340/425.5 |

(Continued)

FOREIGN PATENT DOCUMENTS

| CN | 104700657 A | 6/2015 |
|---|---|---|
| EP | 2763405 | 8/2014 |

(Continued)

OTHER PUBLICATIONS

AdasWorks, GTC Japan, Sep. 2015.

*Primary Examiner* — Zhen Y Wu
(74) *Attorney, Agent, or Firm* — David R. Stevens; Stevens Law Group

(57) ABSTRACT

Techniques and implementations pertaining to detection of moving objects, such as pedestrians, when a vehicle moves in a rearward direction are described. A method may involve identifying a region of interest when a vehicle moves in a rearward direction. The method may involve detecting a moving object in the region of interest. The method may also involve determining whether a collision with the moving object by the vehicle moving in the rearward direction is likely. The method may further involve providing a human-perceivable signal responsive to a determination that the collision is likely.

18 Claims, 4 Drawing Sheets

(56) References Cited

U.S. PATENT DOCUMENTS

| | | | | |
|---|---|---|---|---|
| 8,855,917 | B2* | 10/2014 | Koenig | G01C 21/005 701/400 |
| 2007/0279199 | A1* | 12/2007 | Danz | B60Q 9/006 340/435 |
| 2008/0097700 | A1* | 4/2008 | Grimm | G08G 1/168 701/301 |
| 2009/0045928 | A1 | 2/2009 | Rao et al. | |
| 2010/0201508 | A1* | 8/2010 | Green | B60Q 9/008 340/435 |
| 2010/0271238 | A1 | 10/2010 | Reed et al. | |
| 2010/0289631 | A1* | 11/2010 | Rao | B60R 1/00 340/435 |
| 2013/0060400 | A1 | 3/2013 | Hahne et al. | |
| 2015/0117760 | A1* | 4/2015 | Wang | G06K 9/66 382/157 |
| 2015/0210280 | A1* | 7/2015 | Agnew | B60W 30/09 701/48 |
| 2015/0344028 | A1 | 12/2015 | Gieseke | |
| 2015/0375947 | A1* | 12/2015 | Hochstein | B60Q 9/002 348/143 |
| 2016/0104048 | A1* | 4/2016 | Stein | B60R 1/00 348/229.1 |
| 2016/0375932 | A1* | 12/2016 | Yoon | B60Q 9/002 701/301 |
| 2017/0088045 | A1* | 3/2017 | Bezzina | B60Q 5/005 |
| 2017/0144599 | A1* | 5/2017 | Lee | H04N 5/2628 |

FOREIGN PATENT DOCUMENTS

| | | |
|---|---|---|
| GB | 2463544 | 3/2010 |
| JP | 2011099683 A | 5/2011 |
| WO | WO-200970069 A1 | 6/2009 |

* cited by examiner

PEDESTRIAN DETECTION WHEN A VEHICLE IS REVERSING

TECHNICAL FIELD

The present disclosure generally relates to traffic safety and, more particularly, to detection of moving objects when a vehicle moves in the rearward direction.

BACKGROUND

Various technologies have been employed in motor vehicles (hereinafter "vehicles") being sold on the market today to enhance safety and/or provide convenience to the driver. As an example, some vehicles are equipped with a rearward-facing camera that provides a rearward-facing view from the vehicle so as to aid the driver in reversing the vehicle. A video image of the rearward-facing view may be displayed on a display device in a dashboard of the vehicle, and thus the driver can see what is behind the vehicle without the need to turn his/her head toward the rear of the vehicle. However, the rearward-facing camera is typically used for backing up and the vehicle has little or no ability to automatically detect moving objects such as pedestrians, bicyclists, roller skaters, skateboarders, wheelchairs or any other type of moving persons (hereinafter generally referred to as "moving objects").

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
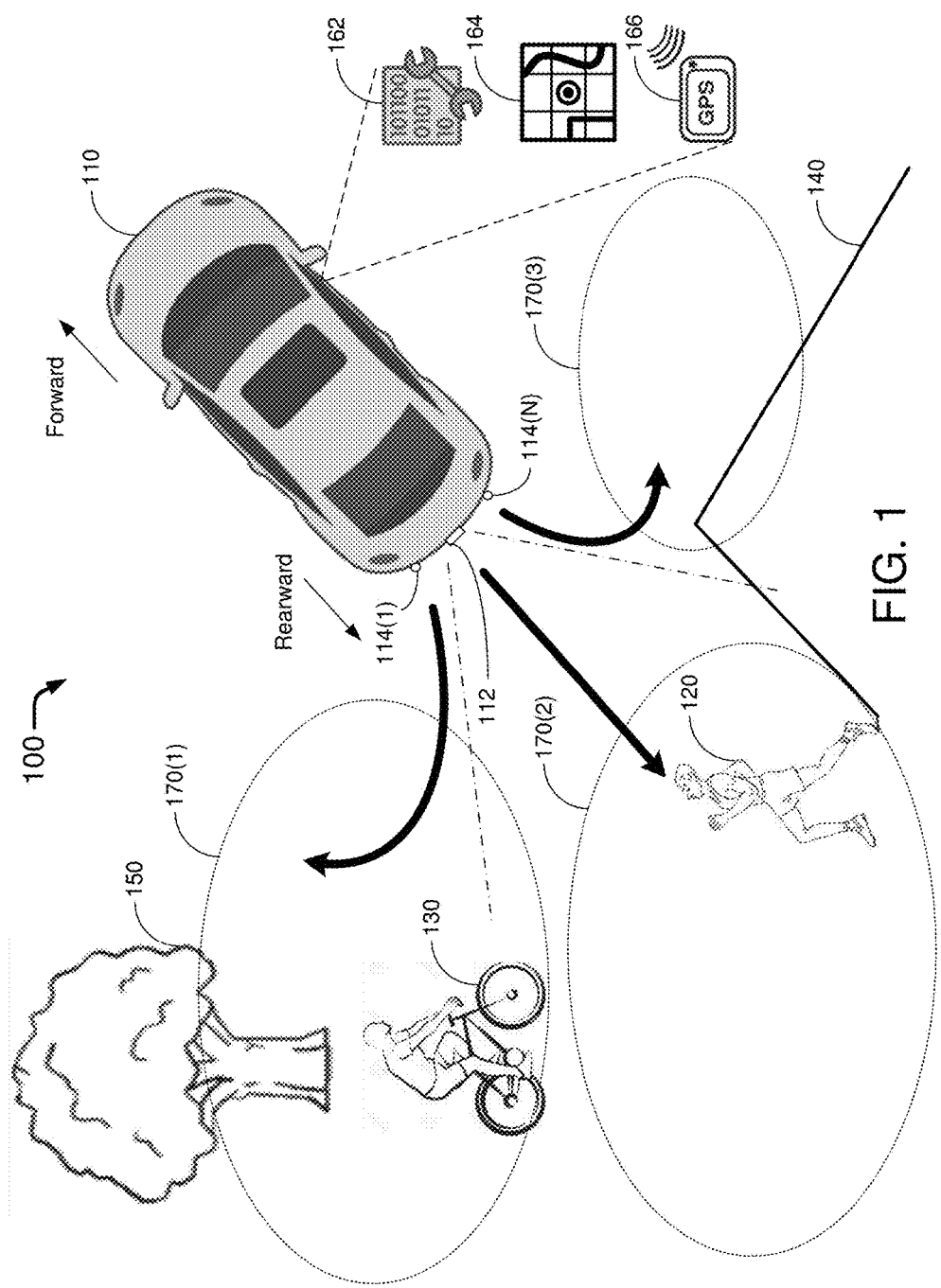
FIG. 1 is a diagram depicting an example scenario in which embodiments in accordance with the present disclosure may be utilized.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure provides a system that uses one or more rear-facing cameras of a vehicle to detect pedestrians when the vehicle is in reverse. The system engages when the vehicle is in reverse and disengages when the vehicle is not in reverse (e.g., when the vehicle begins moving forward). The system may use the one or more rear-facing cameras in combination with other vehicle sensors and vehicle data to detect pedestrians that may be in the path of the reversing vehicle. For example, the system may utilize data on drive history, digital maps and/or Global Positioning System (GPS) data to identify potential region(s) of interest (e.g., sidewalks or crosswalks) in image(s) captured by the one or more rear-facing cameras. The system may provide captured image(s) of the region(s) of interest to a deep neural network to determine whether any moving object may be in the region(s) of interest. Moreover, the system may fusion the camera images with light-detection-and-ranging (LIDAR) data, Radar data and/or ultrasound data to further refine the potential region(s) of interest. Additionally or alternatively, the system may fusion the camera images with data from wirelessly-connected devices and/or data from wirelessly-connected sensors.

When one or more pedestrians and/or objects are identified in the region(s) of interest, the system tracks the location and movement of each pedestrian or object along with the movement of the vehicle to determine the likelihood of collision between the pedestrian/object and the vehicle. Future movement of the vehicle may be predicted using vehicle information such as steering angle and vehicle speed. The system may generate auditory tones (audible to the vehicle driver) that change volume and frequency to indicate whether the pedestrian or object is moving closer to or farther from the vehicle. Additionally or alternatively, the system may produce visual signals (visible to the vehicle driver) that changes color, brightness and/or frequency of flashing to indicate whether the pedestrian/object is moving closer to or farther from the vehicle.

Embodiments in accordance with the present disclosure greatly improve traffic safety by warning the driver of a vehicle in reverse of potential collision with one or more moving objects in one or more regions of interest. Techniques, methods, apparatuses and systems according to the present disclosure may be implemented in manual-driven vehicles as well as autonomous vehicles. In the case of autonomous vehicles, various embodiments in accordance with the present disclosure may be provided as additional safety measures for fusion, enhanced coverage and redundancy.

FIG. 1 illustrates an example scenario 100 in which embodiments in accordance with the present disclosure may be utilized. In scenario 100, various embodiments and techniques pertaining to detection of moving objects may be implemented in an example vehicle 110. Vehicle 110 may perform various actions associated with various embodiments in accordance with the present disclosure when vehicle 110 is reversing (e.g., in a reverse gear and/or moving in a rearward direction).

Vehicle 110 may be equipped with a rearward-facing camera 112 which may be configured to capture one or more still images and/or one or more video images in a rearward direction with respect to vehicle 110. Vehicle 110 may utilize one or more images captured by camera 112 to identify one or more regions of interest, such as regions 170(1)-170(3), when vehicle 110 moves in the rearward direction. Each of regions 170(1)-170(3) may be a region of concern towards which vehicle 110 may move. In scenario 100, region of interest 170(1) may be a region near or around a structure such as a tree 150, region of interest 170(2) may be a region on a first side of a structure such as a curb or sidewalk 140, and region of interest 170(3) may be a region on a second side of curb or sidewalk 140. Vehicle 110 may, based on the one or more images captured by camera 112, detect one or more moving objects, such as a jogger 120 and a bicyclist 130, in the regions of interest 170(1)-170(3). Vehicle 110 may also determine whether a collision with any of the one or more moving objects by vehicle 110, moving in the rearward direction, is likely. It shall be understood that, although a finite number of regions of interest is shown in FIG. 1, different numbers of regions of interest may be identified in various embodiments in accordance with the present disclosure.

In some embodiments, vehicle 110 may provide one or more human-perceivable signals to a driver of vehicle 110 in response to a determination that the collision is likely. For instance, vehicle 110 may provide one or more auditory signals and/or one or more visual signals. Vehicle 110 may also track a distance between each moving object in concern and vehicle 110, which may be constantly varying as either or both each moving object in concern and vehicle 110 may be moving. Vehicle 110 may vary one or more aspects of the human-perceivable signal in response to a change in the distance between each moving object in concern and vehicle 110. For instance, vehicle 110 may vary one or more of a tone, a frequency, and a volume of an auditory signal to indicate that each moving object in concern is getting closer (e.g., increasing tone, increasing frequency and/or increasing volume) or farther from (e.g., decreasing tone, decreasing frequency and/or decreasing volume) vehicle 110. Additionally or alternatively, vehicle 110 may vary one or more of a color, a brightness, and a frequency of a visual signal to indicate that each moving object in concern is getting closer (e.g., changing color of one or more lights from yellow to orange to red, increasing brightness and/or increasing frequency) or farther from (e.g., changing color of one or more lights from red to orange to yellow, decreasing brightness and/or decreasing frequency) vehicle 110.

In some embodiments, vehicle 110 may display on one or more internal display devices an elevated view (e.g., bird's-eye view) of a surrounding of vehicle 110 to show a spatial relation between vehicle 110 and each moving object in concern. Moreover, vehicle 110 may visually highlight each detected moving object in the display of the elevated view.

In some embodiments, vehicle 110 may store or otherwise receive drive history data 162, one or more digital maps 164 and/or global positioning system (GPS) data 166. Drive history data 162 may be a record or log of operations of vehicle 110, and may include information such as, for example and not limited to, data and time of each trip, length of each trip, an average speed associated with each trip and/or a starting point and an end point of each trip in terms of GPS coordinates. The one or more digital maps 164 may include one or more maps of one or more geographic locations stored digitally. The GPS data 166 may indicate a location of vehicle 110 at one or more points in time, past and/or present, in terms of GPS coordinates. Additionally or alternatively, vehicle 110 may be configured to wirelessly communicate with, such as receiving data from, one or more wirelessly-connected devices and/or one or more wirelessly-connected sensors. For instance, jogger 120 and/or bicyclist 130 may wear or carry one or more wirelessly-connected devices (e.g., smartphone, smart necklace, smart bracelet or the like) which may be in wireless communication with vehicle 110 when within a wireless communication range from vehicle 110. Thus, vehicle 110 may wirelessly receive data regarding the location of jogger 120 and/or bicyclist 130 from the wirelessly-connected devices worn or carried by jogger 120 and/or bicyclist 130. Accordingly, in identifying regions of interest 170(1)-170(3), vehicle 110 may localize each of the regions of interest 170(1)-170(3) using the one or more images captured by camera 112 in addition to the drive history data 162, the one or more digital maps 164, the GPS data 166, the data from one or more wirelessly-connected devices, the data from one or more wirelessly-connected sensors, or any combination thereof.

In some embodiments, vehicle 110 may be also equipped with one or more sensors 114(1)-114(N), where N is a positive integer greater than or equal to 1. The one or more sensors 114(1)-114(N) may include, for example and not limited to, one or more LIDAR sensors, one or more radar sensors and/or one or more ultrasound sensors. Accordingly, in identifying the regions of interest 170(1)-170(3), vehicle 110 may refine each of the localized regions of interest 170(1)-170(3) using any number of the one or more sensors 114(1)-114(N).

In some embodiments, in detecting the one or more moving objects in each of the regions of interest 170(1)-170(3), vehicle 110 may analyze the one or more images captured by camera 112 using a machine learning algorithm which may, for example, be executed by a processor with which vehicle 110 is equipped. In some embodiments, the machine learning algorithm may include one or more deep neural networks. The machine learning algorithm employed by vehicle 110, including deep neural network(s), may be configured to learn and classify images to discern whether a particular object in an image may be a moving object of particular concern (e.g., pedestrians, bicyclists, roller skaters, skateboarders, wheelchairs or any other type of moving persons). Thus, by utilizing the machine learning algorithm, vehicle 110 may be able to detect each moving object in each of the regions of interest 170(1)-170(3).

In some embodiments, in determining whether a collision with any moving object by vehicle 110 moving in the rearward direction is likely, vehicle 110 may perform a number of operations. For instance, vehicle 110 may track a movement of each moving object as well as a distance between each moving object and vehicle 110. Moreover, vehicle 110 may determine a trajectory of vehicle 110 in real time and determine whether a collision with each moving object is likely based on the movement of each moving object, the distance between each moving object and vehicle 110, and the trajectory of vehicle 110. In some embodiments, in tracking the distance between each moving object and vehicle 110, vehicle 110 may track the distance between each moving object and vehicle 110 using one or more types of information. The information may include, for example and not limited to, a steering angle of vehicle 110, a speed of vehicle 110, and a current distance between each moving object and vehicle 110. Vehicle 110 may determine the current distance between each moving object and vehicle 110 using camera 112 and the one or more sensors 114(1)-114(N), which may include one or more LIDAR sensors, one or more radar sensors, one or more ultrasound sensors, or any combination thereof.

The above-described functions, actions and operations pertaining to detection of moving objects when vehicle 110 is reversing may cease when vehicle 110 is shifted out of the reverse gear and/or movement/speed of vehicle 110 in the rearward direction is zero.

Figure 2:
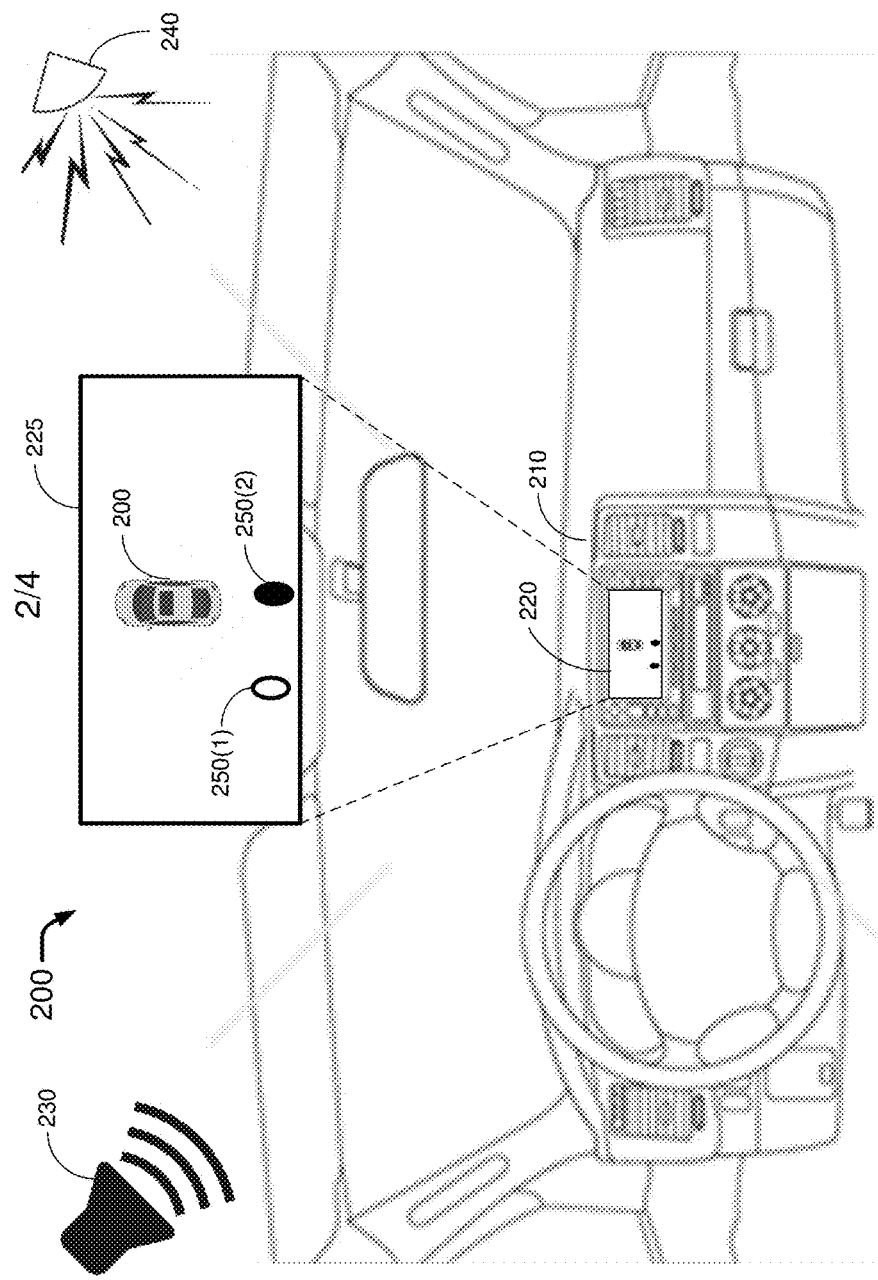
FIG. 2 is a diagram depicting an example vehicle in which embodiments in accordance with the present disclosure may be utilized.

FIG. 2 illustrates an example vehicle 200 in which embodiments in accordance with the present disclosure may be utilized. Vehicle 200 may be an example implementation of vehicle 110 and, thus, description above with respect to vehicle 110 may apply to vehicle 200. Vehicle 200 may include a dashboard 210 having a display device 220 installed therein. Display device 220 may include a flat panel display (e.g., a liquid crystal display, an electroluminescent panel or an organic light-emitting diode panel) and/or a touch-sensing display. For ease of viewing, an enlarged view 225 of an example content being displayed by display device 220 is provided. In the example shown in FIG. 2, an elevated view or bird's-eye view of a surrounding of vehicle 200 to show vehicle 200 and one or more detected moving objects, such as moving objects 250(1) and 250(2), in one or more regions of interest. The elevated view allows a driver of vehicle 200 to quickly understand, upon a glance of display device 220, a spatial relation between vehicle 200 and each of moving objects 250(1) and 250(2). Also in the example shown in FIG. 2, between moving object 250(1) and moving object 250(2), moving object 250(2) may be determined by vehicle 200 to be at risk of collision with vehicle 200 and, therefore, display device 220 may highlight moving object 250(2) by showing moving object 250(2) in a color different from that of moving object 250(1).

Vehicle 200 may also provide one or more auditory signals 230 and/or one or more visual signals 240 to the driver of vehicle 200 in response to a determination that a collision with any moving object (e.g., moving object 250(2)) is likely. The one or more auditory signals 230 may include a steady tone, a beeping tone, a pre-recorded human voice, a computer-synthesized human voice, or any combination thereof. The one or more visual signals 240 may include one or more steady lights of one or more colors, one or more flashing lights of one or more colors, or any combination thereof. Vehicle 200 may track a distance between each moving object in concern and vehicle 200, and vary one or more aspects of the one or more auditory signals 230 and/or one or more visual signals 240 in response to a change in the distance between each moving object in concern and vehicle 200. For instance, vehicle 200 may vary one or more of a tone, a frequency, and a volume of the one or more auditory signals 230 to indicate that each moving object in concern is getting closer (e.g., increasing tone, increasing frequency and/or increasing volume) or farther from (e.g., decreasing tone, decreasing frequency and/or decreasing volume) vehicle 200. Additionally or alternatively, vehicle 200 may vary one or more of a color, a brightness, and a frequency of the one or more visual signals 240 to indicate that each moving object in concern is getting closer (e.g., changing color of one or more lights from yellow to orange to red, increasing brightness and/or increasing frequency) or farther from (e.g., changing color of one or more lights from red to orange to yellow, decreasing brightness and/or decreasing frequency) vehicle 200.

Figure 3:
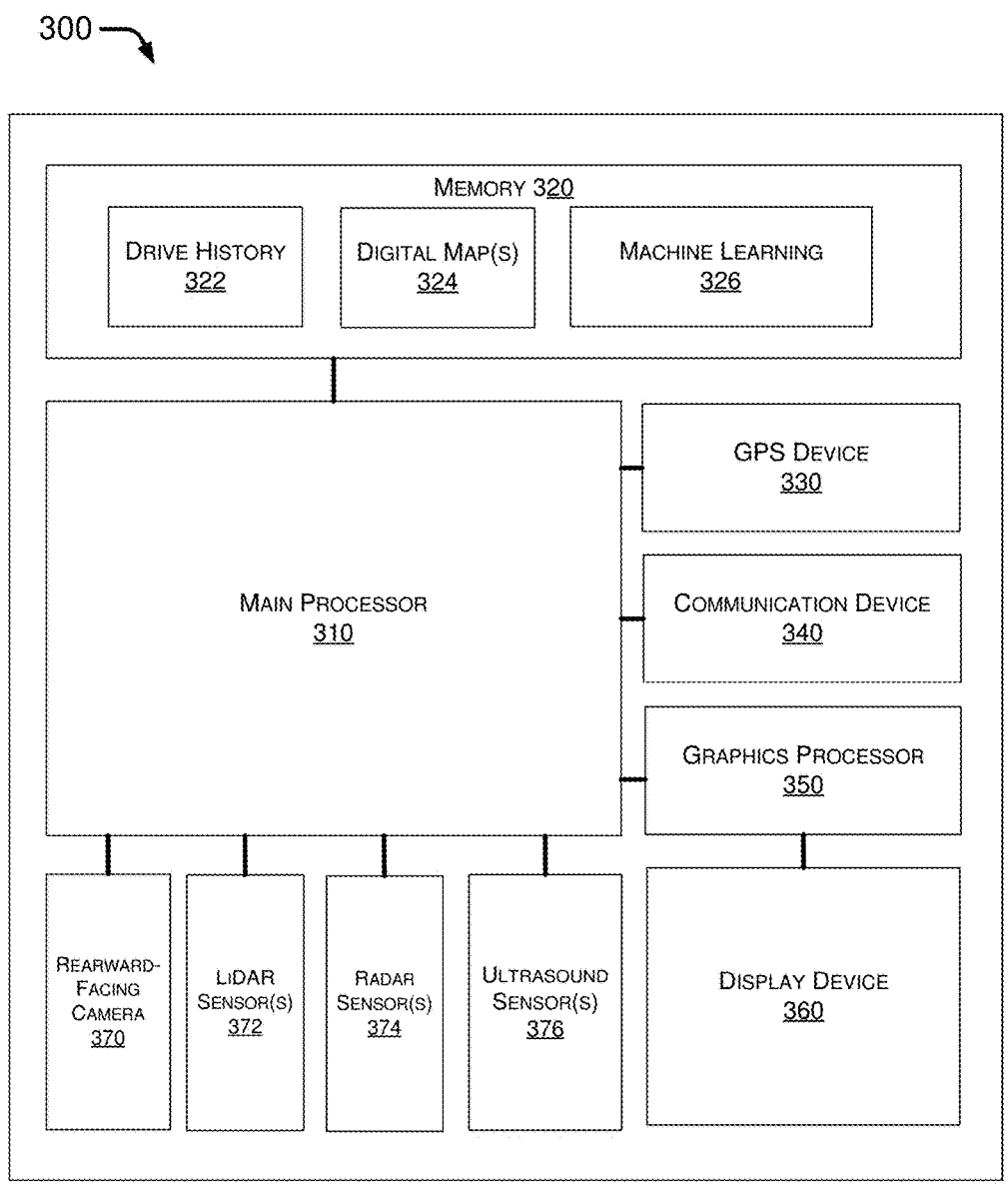
FIG. 3 is a simplified block diagram depicting an example apparatus in accordance with an embodiment of the present disclosure.

FIG. 3 illustrates an example apparatus 300 in accordance with an embodiment of the present disclosure. Apparatus 300 may perform various functions related to techniques, methods and systems described herein, including those described above with respect to vehicle 110 and vehicle 200 as well as those described below with respect to process 400. Apparatus 300 may be installed, equipped or otherwise implemented in vehicle 110 and vehicle 200 to effect various embodiments in accordance with the present disclosure. Apparatus 300 may include at least some of the components illustrated in FIG. 3.

In some embodiments, apparatus 300 may include a camera 370 configured to capture one or more still images and/or video images in a rearward direction with respect to a vehicle in which apparatus 300 is installed, equipped or otherwise implemented (e.g., vehicle 110 and/or vehicle 200). For instance, camera 370 may be a rearward-facing camera that, when mounted or otherwise installed on the vehicle, faces rearward with respect to the vehicle.

In some embodiments, apparatus 300 may also include one or more processors, such as a main processor 310 and a graphics processor 350. Although illustrated as a single discrete component, each of main processor 310 and graphics processor 350 may be implemented in the form of one or more integrated-circuit (IC) chips or functional processors. Main processor 310 may be operatively coupled to camera 370 to receive imagery data from camera 370 and to transmit commands to camera 370 to control operations of camera 370. Main processor 310 may be configured to perform a number of operations in accordance with the present disclosure. In some embodiments, main processor 310 may determine when the vehicle is in reverse gear and/or is moving in a rearward direction. For instance, main processor 310 may receive one or more signals from one or more sensors, detectors and/or devices of the vehicle indicating the gear the vehicle is in (e.g., park, reverse, neutral and drive) and/or the direction in which the vehicle is moving. Main processor 310 may engage or otherwise activate one or more actions associated with various embodiments in accordance with the present disclosure when main processor 310 determines that the vehicle is in reverse gear and/or is moving in the rearward direction. Conversely, main processor 310 may disengage or otherwise deactivate the one or more actions associated with various embodiments in accordance with the present disclosure when main processor 310 determines that the vehicle is not in reverse gear and/or is not moving in the rearward direction.

In some embodiments, main processor 310 may identify, based at least in part on the one or more images captured by camera 370, one or more regions of interest when the vehicle (e.g., vehicle 110 and/or vehicle 200) moves in a rearward direction. Main processor 310 may detect one or more moving objects in at least one region of the one or more regions of interest. Main processor 310 may also determine whether a collision with any of the one or more moving objects by the vehicle, moving in the rearward direction, is likely. In response to a determination that a collision is likely, main processor 310 may provide a human-perceivable signal as a warning to the driver of the vehicle, so as to alert the driver of the likelihood of collision with at least one moving object if the vehicle were to continue its current course and/or speed.

In some embodiments, apparatus 300 may also include a memory device 320 configured to store or otherwise contain data, firmware and software programs therein. Although illustrated as a single discrete component, memory device 320 may be implemented in the form of one or more memories, one or more registers, one or more buffers, one or more caches, or any combination thereof. Memory device 320 may store drive history data 322 and one or more digital maps 324. Apparatus 300 may additionally include a GPS device 330 configured to receive data from GPS satellites and provide GPS data indicative of a geographic location of apparatus 300. GPS device 330 may be, for example, a GPS chip. Accordingly, in identifying the one or more regions of interest, main processor 310 may be configured to localize the one or more regions of interest using the one or more images captured by camera 370 in addition to drive history data 322, one or more digital maps 324, GPS data received from GPS device 330, or any combination thereof.

In some embodiments, apparatus 300 may also include a communication device 340 configured to communicate wirelessly to transmit and receive data wirelessly. Accordingly, main processor 310 may be configured to transmit data to and receive data from one or more wirelessly-connected devices and/or one or more wirelessly-connected sensors via communication device 340. In some embodiments, main processor 310 may be configured to localize the one or more regions of interest using data from one or more wirelessly-connected devices (not shown) and/or data from one or more wirelessly-connected sensors (not shown). In some embodiments, in identifying the one or more regions of interest, main processor 310 may be configured to localize the one or more regions of interest using the one or more images captured by camera 370 in addition to drive history data 322, one or more digital maps 324, GPS data received from GPS device 330, data from one or more wirelessly-connected devices, data from one or more wirelessly-connected sensors, or any combination thereof.

Additionally, apparatus 300 may further include one or more LIDAR sensors 372, one or more radar sensors 374, one or more ultrasound sensors 376, or any combination thereof. Accordingly, in identifying the one or more regions of interest, main processor 310 may be further configured to refine the localized one or more regions of interest using any number of the one or more LIDAR sensors 372, any number of the one or more radar sensors 374 and/or any number of the one or more ultrasound sensors 376.

In some embodiments, memory device 320 may also store one or more sets of instructions of a machine learning algorithm 326. Accordingly, in detecting the one or more moving objects in the one or more regions of interest, main processor 310 may be configured to analyze the one or more images captured by camera 370 using machine learning algorithm 326. In some embodiments, machine learning algorithm 326 may include a deep neural network.

In some embodiments, in determining whether a collision with the at least one moving object by the vehicle moving in the rearward direction is likely, main processor 310 may be configured to perform a number of operations. Using vehicle 110 as the vehicle and using jogger 120 as the moving object in concern for illustration, main processor 310 may track a movement of jogger 120 and track a distance between jogger 120 and vehicle 110. Main processor 310 may also determine a trajectory of vehicle 110, for example, by utilizing information on a steering angle of vehicle 110 and a speed of vehicle 110. Main processor 310 may further determine whether the collision with jogger 120 by vehicle 110 is likely based on the movement of jogger 120, the distance between jogger 120 and vehicle 110, and the trajectory of vehicle 110.

In some embodiments, in providing the human-perceivable signal, main processor 310 may be configured to perform a number of operations. Using vehicle 200 for illustration, main processor 310 may provide the human-perceivable signal in the form of one or more auditory signals 230 and/or one or more visual signals 240. Main processor 310 may also track a distance between the moving object and the vehicle and vary one or more aspects of the human-perceivable signal responsive to a change in the distance between the moving object and the vehicle. For instance, main processor 310 may vary one or more of a tone, a frequency, and a volume of the one or more auditory signals 230. Alternatively or additionally, main processor 310 may vary one or more of a color, a brightness, and a frequency of the one or more visual signals 240.

In some embodiments, in tracking the distance between the moving object and the vehicle, main processor 310 may be configured to track the distance between the moving object and the vehicle using information on the steering angle of the vehicle, the speed of the vehicle, a current distance between the moving object and the vehicle, or any combination thereof. Main processor 310 may determine the current distance between the moving object and the vehicle using camera 370, any number of the one or more LIDAR sensors 372, any number of the one or more radar sensors 374, any number of the one or more ultrasound sensors 376, or any combination thereof.

In some embodiments, apparatus 300 may further include a display device 360 configured to display textual information, graphical information and/or video information. Display device 360 may be operatively coupled to graphics processor 350 to receive content for display from graphics processor 350. Graphics processor 350 may control display device 360 to display an elevated view (e.g., bird's-eye view) of a surrounding of the vehicle to show the vehicle and the one or more moving objects detected in the one or more regions of interest. Graphics processor 350 may also control display device 360 to highlight at least one of the one or more moving objects. For example, graphics processor 350 may control display device 360 to highlight each or at least one moving object by a predetermined color, by denoting the highlighted moving object(s) with line(s), curve(s), circle(s) or the like, by using visual effect(s) (e.g., flashing), or by any suitable visible way to draw attention to the highlighted moving object(s) as displayed on display device 360. Advantageously, the driver of the vehicle may be made aware of at least one moving object (e.g., a moving object that may likely be in collision with the vehicle in the near future) and, hence, may change the steering angle and/or speed of the vehicle so as to avoid the collision.

Figure 4:
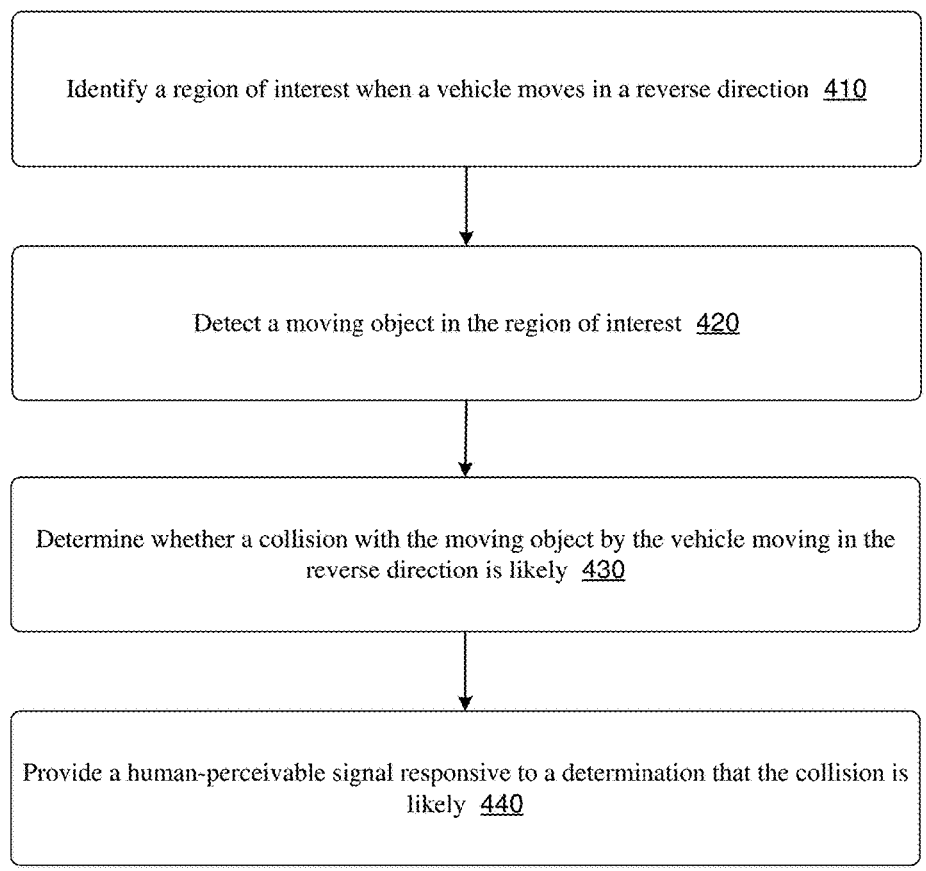
FIG. 4 is a flowchart depicting an example process in accordance with an embodiment of the present disclosure.

FIG. 4 illustrates an example process 400 for pedestrian detection when a vehicle is reversing in accordance with the present disclosure. Process 400 may include one or more operations, actions, or functions shown as blocks such as 410, 420, 430 and 440. Although illustrated as discrete blocks, various blocks of process 400 may be divided into additional blocks, combined into fewer blocks, or eliminated, depending on the desired implementation. Process 400 may be implemented by vehicle 100 and apparatus 300. For illustrative purpose without limiting the scope of process 400, the following description of process 400 is provided in the context of vehicle 110 in scenario 100. Process 400 may begin with block 410.

At 410, process 400 may involve vehicle 110 identifying a region of interest when vehicle 110 moves in a rearward direction. Process 400 may proceed from 410 to 420.

At 420, process 400 may involve vehicle 110 detecting a moving object in the region of interest. Process 400 may proceed from 420 to 430.

At 430, process 400 may involve vehicle 110 determining whether a collision with the moving object by vehicle 110 moving in the rearward direction is likely. Process 400 may proceed from 430 to 440.

At 440, process 400 may involve vehicle 110 providing a human-perceivable signal responsive to a determination that the collision is likely.

In some implementations, in identifying the region of interest, process 400 may involve vehicle 110 localizing the region of interest using one or more images captured by a rearward-facing camera in addition to drive history data, one or more digital maps, GPS data, or any combination thereof.

In some implementations, in identifying the region of interest, process 400 may further involve vehicle 110 refining the localized region of interest using a LIDAR sensor, a radar sensor, an ultrasound sensor, or any combination thereof.

In some implementations, in detecting the moving object in the region of interest, process 400 may involve vehicle 110 analyzing one or more images captured by a rearward-facing camera using a machine learning algorithm. In some implementations, the machine learning algorithm may include a deep neural network.

In some implementations, in determining whether a collision with the moving object by vehicle 110 moving in the rearward direction is likely, process 400 may involve vehicle 110 performing a number of operations. For instance, process 400 may involve vehicle 110 tracking a movement of the moving object. Process 400 may also involve vehicle 110 tracking a distance between the moving object and vehicle 110. Process 400 may further involve vehicle 110 determining a trajectory of vehicle 110. Process 400 may additionally involve vehicle 110 determining whether the collision with the moving object by vehicle 110 is likely based on the movement of the moving object, the distance between the moving object and vehicle 110, and the trajectory of vehicle 110.

In some implementations, in providing the human-perceivable signal, process 400 may involve vehicle 110 performing a number of operations. For instance, process 400 may involve vehicle 110 providing the human-perceivable signal which comprises either or both of an auditory signal and a visual signal. Process 400 may also involve vehicle 110 tracking a distance between the moving object and vehicle 110. Process 400 may further involve vehicle 110 varying one or more aspects of the human-perceivable signal responsive to a change in the distance between the moving object and vehicle 110.

In some implementations, in tracking the distance between the moving object and vehicle 110, process 400 may involve vehicle 110 tracking the distance between the moving object and vehicle 110 using information on one or more of a steering angle of vehicle 110, a speed of vehicle 110, and a current distance between the moving object and vehicle 110 using a rearward-facing camera, a LIDAR sensor, a radar sensor, an ultrasound sensor, or any combination thereof.

In some implementations, in varying the one or more aspects of the human-perceivable signal, process 400 may involve vehicle 110 varying one or more of a tone, a frequency, and a volume of the human-perceivable signal when the human-perceivable signal comprises the auditory signal. Additionally, process 400 may involve vehicle 110 varying one or more of a color, a brightness, and a frequency of the human-perceivable signal when the human-perceivable signal comprises the visual signal.

In some implementations, process 400 may involve vehicle 110 performing additional operations. For instance, process 400 may involve vehicle 110 displaying an elevated view of a surrounding of vehicle 110 to show vehicle 110 and the moving object. Moreover, process 400 may involve vehicle 110 highlighting the moving object in the displaying of the elevated view.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
    identifying, by a processor of a vehicle, a region of interest when a vehicle moves in a rearward direction;
    detecting, by the processor based on data received from one or more sensors on the vehicle, a moving object in the region of interest;
    determining, by the processor, whether a collision with the moving object by the vehicle moving in the rearward direction is likely; and
    providing, by the processor, a human-perceivable signal responsive to a determination that the collision is likely,
    wherein the identifying of the region of interest comprises localizing the region of interest using one or more images captured by a rearward-facing camera with drive history data and one or more digital maps plus at least one of:
        global positioning system (GPS) data,
        data from one or more wirelessly-connected devices, and
        data from one or more wirelessly-connected sensors, and
    wherein the providing of the human-perceivable signal comprises varying a tone of an auditory signal to indicate whether the moving object is moving closer to or away from the vehicle.

2. The method of claim 1, wherein the identifying of the region of interest further comprises refining the localized region of interest using a light-detection-and-ranging (LIDAR) sensor, a radar sensor, an ultrasound sensor, or any combination thereof.

3. The method of claim 1, wherein the detecting of the moving object in the region of interest comprises analyzing one or more images captured by a rearward-facing camera using a machine learning algorithm.

4. The method of claim 3, wherein the machine learning algorithm comprises a deep neural network.

5. The method of claim 1, wherein the determining of whether a collision with the moving object by the vehicle moving in the rearward direction is likely comprises:
    tracking a movement of the moving object;
    tracking a distance between the moving object and the vehicle using the data received from the one or more sensors and information on one or more operational parameters of the vehicle;
    determining a trajectory of the vehicle; and
    determining whether the collision with the moving object by the vehicle is likely based on the movement of the moving object, the distance between the moving object and the vehicle, and the trajectory of the vehicle.

6. The method of claim 1, wherein the providing of the human-perceivable signal comprises:
    providing the human-perceivable signal which comprises either or both of the auditory signal and a visual signal;
    tracking a distance between the moving object and the vehicle using the data received from the one or more sensors and information on one or more operational parameters of the vehicle; and
    varying one or more aspects of the human-perceivable signal responsive to a change in the distance between the moving object and the vehicle.

7. The method of claim 6, wherein the tracking of the distance between the moving object and the vehicle comprises tracking the distance between the moving object and the vehicle using information on one or more of a steering angle of the vehicle, a speed of the vehicle, and a current distance between the moving object and the vehicle using a rearward-facing camera, a light-detection-and-ranging (LIDAR) sensor, a radar sensor, an ultrasound sensor, or any combination thereof.

8. The method of claim 6, wherein the varying of the one or more aspects of the human-perceivable signal comprises:

varying at least one of a frequency and a volume of the human-perceivable signal in addition to the tone when the human-perceivable signal comprises the auditory signal; and varying one or more of a color, a brightness, and a frequency of the human-perceivable signal when the human-perceivable signal comprises the visual signal.

9. The method of claim 1, further comprising:

displaying an elevated view of a surrounding of the vehicle to show the vehicle and the moving object; and highlighting the moving object in the displaying of the elevated view.

10. An apparatus implementable in a vehicle, comprising:

a camera configured to capture one or more images in a rearward direction with respect to the vehicle; and one or more processors operatively coupled to the camera, the one or more processors configured to perform operations comprising:

identifying, based at least in part on the one or more images, a region of interest when the vehicle moves in a rearward direction;

detecting a moving object in the region of interest;

determining whether a collision with the moving object by the vehicle moving in the rearward direction is likely; and providing a human-perceivable signal responsive to a determination that the collision is likely, wherein, in identifying the region of interest, the one or more processors are configured to localize the region of interest using the one or more images captured by the camera with drive history data and one or more digital maps plus at least one of:

global positioning system (GPS) data, data from one or more wirelessly-connected devices, and from one or more wirelessly-connected sensors.

11. The apparatus of claim 10, further comprising:

one or more of a light-detection-and-ranging (LIDAR) sensor, a radar sensor, and an ultrasound sensor, wherein, in identifying the region of interest, the one or more processors are further configured to refine the localized region of interest using one or more of the LIDAR sensor, the radar sensor, and the ultrasound sensor.

12. The apparatus of claim 10, wherein, in detecting the moving object in the region of interest, the one or more processors are configured to analyze the one or more images captured by the camera using a machine learning algorithm.

13. The apparatus of claim 12, wherein the machine learning algorithm comprises a deep neural network.

14. The apparatus of claim 10, wherein, in determining whether a collision with the moving object by the vehicle moving in the rearward direction is likely, the one or more processors are configured to perform operations comprising:

tracking a movement of the moving object;

tracking a distance between the moving object and the vehicle;

determining a trajectory of the vehicle; and determining whether the collision with the moving object by the vehicle is likely based on the movement of the moving object, the distance between the moving object and the vehicle, and the trajectory of the vehicle.

15. The apparatus of claim 10, wherein, in providing the human-perceivable signal, the one or more processors are configured to perform operations comprising:

providing the human-perceivable signal which comprises either or both of an auditory signal and a visual signal;

tracking a distance between the moving object and the vehicle; and varying one or more aspects of the human-perceivable signal responsive to a change in the distance between the moving object and the vehicle.

16. The apparatus of claim 15, wherein, in tracking the distance between the moving object and the vehicle, the one or more processors are configured to track the distance between the moving object and the vehicle using information on one or more of a steering angle of the vehicle, a speed of the vehicle, and a current distance between the moving object and the vehicle using the camera, a light-detection-and-ranging (LIDAR) sensor, a radar sensor, an ultrasound sensor, or any combination thereof.

17. The apparatus of claim 15, wherein, in varying the one or more aspects of the human-perceivable signal, the one or more processors are configured to perform operations comprising:

varying one or more of a tone, a frequency, and a volume of the human-perceivable signal when the human-perceivable signal comprises the auditory signal; and varying one or more of a color, a brightness, and a frequency of the human-perceivable signal when the human-perceivable signal comprises the visual signal.

18. The apparatus of claim 10, further comprising:

a display device, wherein the one or more processors are further configured to perform operations comprising:

displaying, on the display device, an elevated view of a surrounding of the vehicle to show the vehicle and the moving object; and highlighting, on the display device, the moving object in the displaying of the elevated view.

* * * * *